| (12) | United States Patent | (10) Patent No.: | US 11,355,939 B2 |
|---|---|---|---|
| | Edelhäuser et al. | (45) Date of Patent: | Jun. 7, 2022 |

(54) DEVICE AND PROCESS FOR DISCHARGING AN INTERMEDIATE CIRCUIT CAPACITOR AND PROCESS FOR PRODUCING A DEVICE FOR DISCHARGING AN INTERMEDIATE CIRCUIT CAPACITOR

(71) Applicant: VALEO SIEMENS EAUTOMOTIVE GERMANY GMBH, Erlangen (DE)

(72) Inventors: Rainer Edelhäuser, Nuremberg (DE); Thomas Götze, Höchstadt/Aisch (DE)

(73) Assignee: VALEO SIEMENS EAUTOMOTIVE GERMANY GMBH, Erlangen (DE)

( * ) Notice: Subject to any disclaimer, the term of this patent is extended or adjusted under 35 U.S.C. 154(b) by 540 days.

(21) Appl. No.: 16/454,877

(22) Filed: Jun. 27, 2019

(65) Prior Publication Data

US 2020/0006965 A1    Jan. 2, 2020

(30) Foreign Application Priority Data

Jun. 29, 2018 (DE) ...................... 10 2018 115 802.5

(51) Int. Cl.
*H02J 7/00* (2006.01)
*H02M 1/32* (2007.01)

(52) U.S. Cl.
CPC .......... *H02J 7/0031* (2013.01); *H02J 7/0086* (2013.01); *H02M 1/32* (2013.01); *H02M 1/322* (2021.05)

(58) Field of Classification Search
USPC .......................... 320/107, 108, 132, 134, 136
See application file for complete search history.

(56) References Cited

U.S. PATENT DOCUMENTS

2013/0234510 A1 * 9/2013 Nakamura ............ B60L 3/0007
307/10.1

FOREIGN PATENT DOCUMENTS

| EP | 2 284 982 A1 | 2/2011 | |
|---|---|---|---|
| EP | 2284982 B1 * | 5/2018 | ............. B60K 6/445 |
| JP | 2015204657 A * | 11/2015 | |
| JP | 2017060261 A * | 3/2017 | |
| JP | 2019080396 A * | 5/2019 | |
| KR | 20160122351 A * | 10/2016 | |
| WO | WO-2015004948 A1 * | 1/2015 | .......... B60L 11/1803 |

* cited by examiner

*Primary Examiner* — Brian Ngo
(74) *Attorney, Agent, or Firm* — Manabu Kanesaka

(57) ABSTRACT

A device discharges an intermediate circuit capacitor. The device includes a power converter for supplying electricity to an electrical machine powering a vehicle, having the intermediate circuit capacitor and a discharge device with a series circuit of a controllable switching element and a load resistor, and a high-voltage battery feeding the power converter on the input side. The power converter has a control equipment to control the switching element, depending on a signal state at an input of the control equipment, to perform a fixed predefined number of switching operations, in which the switching element conducts, with a fixed predefined duration and a fixed predefined delay between two successive switching operations. The load resistor and its heat transfer to the power converter are set so that the load resistor is not damaged if a maximum constant voltage of the high-voltage battery is applied during a respective switching operation.

9 Claims, 1 Drawing Sheet

Figure 1:
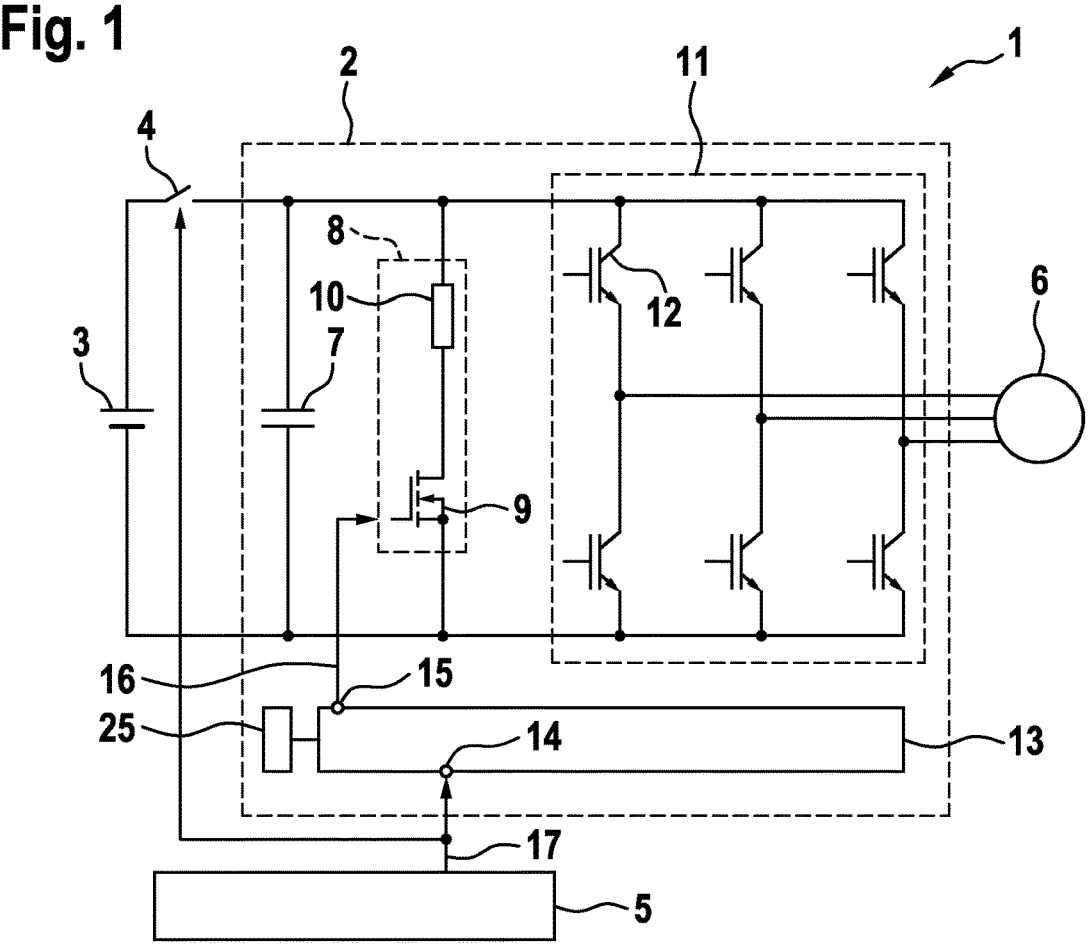

DEVICE AND PROCESS FOR DISCHARGING AN INTERMEDIATE CIRCUIT CAPACITOR AND PROCESS FOR PRODUCING A DEVICE FOR DISCHARGING AN INTERMEDIATE CIRCUIT CAPACITOR

RELATED APPLICATIONS

The present application is based on, and claims priority from, German Application No. 10 2018 115 802.5 filed Jun. 29, 2018, the disclosure of which is hereby incorporated by reference herein in its entirety.

This invention relates to a device for discharging an intermediate circuit capacitor, this device comprising a power converter for supplying electricity to an electrical machine powering a vehicle, this power converter having the intermediate circuit capacitor and, connected in parallel with the intermediate circuit capacitor, a discharge device with a series circuit of a controllable switching element and a load resistor, and a high-voltage battery feeding the power converter on the input side.

The invention additionally relates to a process for discharging an intermediate circuit capacitor and a process for producing a device for discharging an intermediate circuit capacitor.

Intermediate circuit capacitors provide high transient currents when a power converter is operated. If a fault occurs or in the case of an accident of a vehicle having the power converter, the intermediate circuit capacitor should be quickly discharged, by means of a discharge device, to a protective extra-low voltage, to ensure electrical safety. The charge stored in the intermediate circuit capacitor must be converted into heat, at least until the protective extra-low voltage has been reached. A controller of the vehicle signals that the intermediate circuit capacitor should be discharged and simultaneously controls an interrupter, which connects a high-voltage battery with the intermediate circuit capacitor, to interrupt this connection. Typically, it is not known, on the part of the power converter, whether this interruption was successful. If this is not the case, controlling the discharge device to discharge the intermediate circuit capacitor through a load resistor can lead to its destruction, since the high-voltage battery is providing a full load current through the load resistor.

The document EP 2 284 982 A1 discloses a discharge circuit for an intermediate circuit capacitor that is used in a power conversion device, this discharge circuit comprising a resistor that discharges the capacitor; a switch that is connected in series with the resistor and that either allows a discharge current to pass from the capacitor to the resistor or interrupts this discharge current; a measuring circuit that measures a terminal voltage of the capacitor; and a control circuit that controls the switch to conduct or block the discharge current. After the control circuit controls the switch to conduct and the discharging of the capacitor through the resistor has begun, the control circuit controls the switch to block and to end the discharge through the resistor if the capacitor's terminal voltage measured by the measuring circuit deviates from specified voltage decrease characteristics.

Such a device does allow the discharge to be stopped if the intermediate circuit capacitor is connected with the high-voltage battery. However it requires a substantial expense for components: first the measuring circuit and second the control circuit, which must perform computationally intensive comparisons of the measured terminal voltage with the voltage decrease characteristics. Typically, this can only be realized by a microcontroller which must, being a safety critical component, meet high integrity requirements. This leads to substantial expense when designing and producing such a device.

Consequently, the invention has the goal of indicating a possible process for discharging an intermediate circuit capacitor, this process being less expensive to implement and preventing damage to the intermediate circuit capacitor, even if a direct voltage source is not disconnected from the intermediate circuit capacitor.

To achieve this goal, the invention proposes a device of the type mentioned at the beginning in which the power converter has control equipment that is set up to control the switching element, depending on a signal state at an input of the control equipment, to perform a fixed predefined number of switching operations, in which the switching element conducts, with a fixed predefined duration and a fixed predefined delay between two successive switching operations, the load resistor and its heat transfer to the power converter being set up so that the load resistor is not damaged if a maximum constant voltage of the high-voltage battery is applied to it during a respective switching operation and it cools for the or a respective delay.

This invention is based on the idea of having the switching element control the discharge device, without any checking of whether the intermediate circuit capacitor has really been disconnected from the high-voltage battery, to discharge the intermediate circuit capacitor, and structurally designing the power converter, including the load resistor, so that even in the most unfavorable case of a load current flowing from the high-voltage battery, damage of the intermediate circuit capacitor is avoided. The fixed predefined duration is expediently selected in such a way that if the capacitor is charged with the maximum constant voltage of the high-voltage battery, the capacitor is discharged to a protective extra-low voltage if the intermediate circuit capacitor is disconnected from the high-voltage battery. Then, the following switching operations only lead to small further load currents. By contrast, if the high-voltage battery is not disconnected from the intermediate circuit capacitor, then further attempts to discharge the intermediate circuit capacitor are made by the further switching operations, since the disconnection still could have occurred in the meantime. The power converter is structurally designed so that although the load resistor does heat up when the maximum constant voltage is applied, it cools back down during the subsequent delays, so the fixed predefined number of switching operations does not damage the load resistor.

This advantageously makes it possible to realize a safe discharge strategy without any monitoring of the voltage drop across the intermediate circuit capacitor. In particular, it is possible to do without expensive measuring devices and a complex evaluation of the intermediate circuit voltage, which would be subject to high integrity requirements. The reason why is that controlling the switching element by the control equipment in this way is so simple to implement that it is possible to do without a microcontroller.

Preferably, the fixed predefined number of switching operations is at least two, preferably at least five. According to empirical tests, this number represents a sensible compromise between the temperature and current stability of the load resistor and the probability that the high-voltage battery is disconnected from the intermediate circuit capacitor close in time to these switching operations. It is expedient that the fixed predefined duration of a switching operation be at least one second and/or no more than three seconds. The delay can be at least four seconds and/or no more than seven seconds.

According to an advantageous further development of the inventive device, the control equipment is further set up to control the switching element after the last of the switching operations and after passage of a fixed predefined second delay, which is longer than the first delay, to perform multiple further switching operations, the second delay being provided between two successive further switching operations. Typically, the load resistor almost reaches its thermal load limit after the last of the first switching operations. After that, more intensive cooling is required for the duration of the second delay. Then, in case the intermediate circuit capacitor had not yet disconnected from the high-voltage battery after the first switching operations, the attempt is still made, by the further switching operations, to discharge the intermediate circuit capacitor because a disconnection has occurred in the meantime. However, longer cooling phases are used for this, which are realized by the second delay. The second delay can be at least 10 seconds, especially at least 25 seconds, and/or no more than 50 seconds, especially no more than 35 seconds.

Furthermore, the control equipment is preferably set up to control the discharge device to perform the further switching operations until a deactivation signal is received at the input. Consequently, no fixed number of further switching operations is provided. Instead, these further switching operations are performed until there is a deactivation signal or until no voltage, in particular low voltage, is supplied to the control equipment.

As was already indicated at the beginning, the inventive device preferably provides that the intermediate circuit capacitor and the high-voltage battery are connected with one another through an electrical connection having an interrupter, and a controller is provided that is operable independently of the first control equipment and is set up to provide a change in the signal state as an input signal requesting the discharge of the intermediate circuit capacitor to both the control equipment and also to the interrupter.

In addition, the invention relates to a process for discharging an intermediate circuit capacitor in a power converter of a vehicle, this power converter being used for supplying electricity to an electrical machine powering the vehicle, this power converter having the intermediate circuit capacitor and, connected in parallel with the intermediate circuit capacitor, a discharge device with a series circuit of a controllable switching element and a load resistor, the switching element being controlled, depending on a signal state, to perform a fixed predefined number of switching operations, in which the switching element conducts, with a fixed predefined duration and a fixed predefined delay between two successive switching operations, the load resistor and its heat transfer to the power converter being set up so that the load resistor is not damaged if a maximum constant voltage of a high-voltage battery feeding the power converter is applied to it during a respective switching operation and it cools for the or a respective delay.

Finally, the invention relates to a process for producing a device for discharging an intermediate circuit capacitor, this process comprising the following steps:

providing a high-voltage battery for feeding a power converter and providing an intermediate circuit capacitor for the power converter;

providing control equipment for the power converter, this control equipment being set up to control the switching element, depending on a signal state at an input of the control equipment, to perform a fixed predefined number of switching operations, in which the switching element conducts, with a fixed predefined duration and a fixed predefined delay between two successive switching operations;

providing the discharge device to be controlled by the control equipment with a series circuit of a controllable switching element and a load resistor, the load resistor being selected and integrated into the power converter in such a way that the load resistor is not damaged if a maximum constant voltage of the high-voltage battery is applied to it for the fixed predefined duration to discharge the intermediate circuit capacitor, followed by cooling for the or a respective delay;

connecting the high-voltage battery with the discharge device and the intermediate circuit capacitor; and connecting the control equipment with the discharge device.

All embodiments of the inventive device can be analogously applied to the inventive processes, so that these inventive processes can also achieve the previously mentioned advantages.

Figure 2:
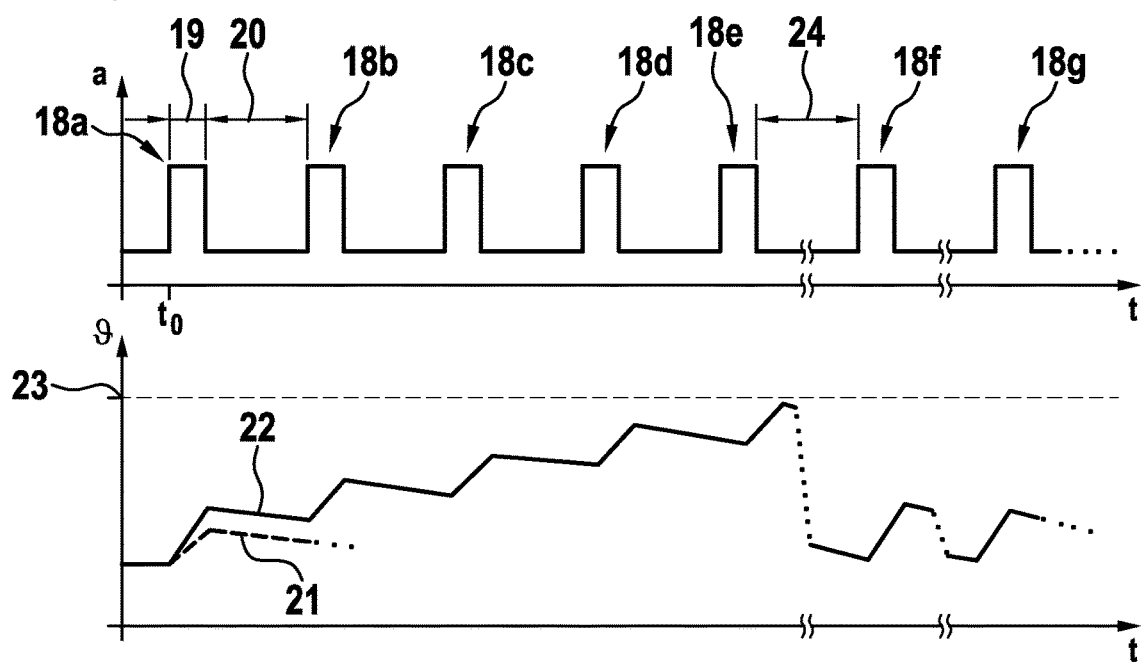

Other advantages and details of this invention follow from the sample embodiments described below and the drawings. The drawings are schematic representations, and show the following:

FIG. 1 a block diagram of a sample embodiment of the inventive device for discharging an intermediate circuit capacitor; and FIG. 2 time behavior curves of an control signal for a switching element of a discharge device and of a temperature of a load resistor of the discharge device.

FIG. 1 is a schematic diagram of a sample embodiment of a device 1, which has a power converter 2, a high-voltage battery 3, an interrupter 4 connecting the high-voltage battery 3 with the input side of the power converter 2, and a controller 5. The device 1 is, in particular, part of a high-voltage vehicle electrical system of an electrically powerable vehicle, in particular an electric vehicle or a hybrid vehicle, the power converter 2 being set up to convert a direct voltage of, for example, 500 volts provided by the high-voltage battery 3 into a polyphase alternating voltage for supplying a electrical machine 6 powering the vehicle.

The power converter 2 comprises an intermediate circuit capacitor 7 and, connected in parallel with the intermediate circuit capacitor, a discharge device 8 with a series circuit of a controllable switching element 9 and a load resistor 10. In addition, the power converter 2 comprises a power unit 11 with multiple power switching elements connected into half bridges, for example IGBTs, which are controllable in such a way that they convert direct voltage into polyphase alternating voltage.

The power converter 2 comprises control equipment 13, which is set up to control the switching element 9 of the discharge device 8 depending on a signal state at an input 14 of the control equipment 13. To accomplish this, the control equipment 13 provides, at an output 15, a control signal 16 for the switching element 9.

The control equipment 13 receives, at its input 14, an input signal 17 from the controller 5, which is in the form of a master controller of the vehicle. The controller 5 outputs the input signal 17 in the form of a deactivation signal, upon receipt of which at the input 14 the control equipment 13 suppresses a control of the switching element 9 to discharge the intermediate circuit capacitor 7. If the controller 5 requests a discharge of the intermediate circuit capacitor 7, for example because of a fault, an accident, or when the vehicle is turned off, or if the input signal 17 is lost at the input 15, for example because of a communication error between the control equipment 5, 13, then the control equipment 13 controls the switching element 9, as is described in detail below, to conduct, connecting the load resistor 10 in parallel with the intermediate circuit capacitor 7. The controller 5 also provides the input signal 17 to the interrupter 4, which disconnects the intermediate circuit capacitor 7 from the high-voltage battery 3 upon a request for discharge.

Therefore, the primary function of the device 1 is to disconnect the intermediate circuit capacitor 7 from the high-voltage battery 3 upon a request by the controller 5, and to put the switching element 9 in its conducting state, so that the electrical energy stored in the intermediate circuit capacitor 7 is converted into heat, at least until a protective extra-low voltage, for example 60 volts, is reached.

However, cases are also conceivable in which the change in the signal state at the input 14 initiates a switching operation by the switching element 9, however the high-voltage battery 3 is not disconnected from the intermediate circuit capacitor 7 by means of the interrupter 4. This comprises, for example, cases in which the communication between the controller 5 and the control equipment 13 is disturbed, so that the control equipment 13 requests a discharge of the intermediate circuit capacitor 7, although the controller 5 has not at all requested this. It is also conceivable that the interrupter 4 does not open as planned, despite a request by the controller 5, for example since mechanical switches of the interrupter 4 "hang" in the closed state.

FIG. 2 shows the time behavior curve of the signal state of the control signal 16 (labeled with a) and that of a temperature $\vartheta$ of the load resistor 10.

At a time point $t_0$, there is a change in the signal state of the input signal 17 at the input 14 of the control equipment 13. In reaction to this change in the signal state, the control equipment 13 controls the switching element 9 to perform a fixed predefined number of five switching operations 18*a* through 18*e* with a fixed predefined duration 19 and a fixed predefined first delay 20 between two successive switching operations 18*a* through 18*e*. If the high-voltage battery 3 is successfully disconnected from the intermediate circuit capacitor 7 by means of the interrupter 4, then the intermediate circuit capacitor 7 is discharged from its momentary voltage to the protective extra-low voltage within the duration 19, in this case two seconds. As this happens, load resistor 10 exhibits the temperature behavior that is illustrated in purely qualitative terms by temperature curve 21. The following switching operations 18*b* through 18*e* only contribute to further discharge of the intermediate circuit capacitor 7 below the protective extra-low voltage.

However, if the intermediate circuit capacitor 7 is still connected with the high-voltage battery 3, then the load current flowing through the load resistor 10 during the switching operation 18*a* is essentially provided by the high-voltage battery 3, which can provide its maximum constant voltage, depending on its operating state. This leads to substantial heating of the load resistor 10, which is described by the temperature curve 22. It can be seen that the load resistor 10 heats up strongly and cools off a little during the delay 20. If disconnection by the interrupter 4 still does not occur after that, then the load resistor 10 continues to heat up during the switching operations 18*b* through 18*e* until it has reached, after the switching operation 18*e*, a maximum temperature 23 which it survives without damage. Consequently, the load resistor 10 and its heat transfer to the power converter 2 are set up so that the load resistor 10 is not damaged if the maximum constant voltage of the high-voltage battery 3 is applied to it during a respective switching operation 18*a* through 18*e* and it cools for the respective delays 20. If the interrupter 4 should, between the time point to and the beginning of the switching operation 18*e*, disconnect the high-voltage battery 3 from the intermediate circuit capacitor 7, then the intermediate circuit capacitor 7 is discharged, during one of the switching operations 18*b* through 18*e*, to the protective extra-low voltage, without subsequently reaching the maximum temperature 23.

The control equipment 13 is also set up to control the switching element 9 after the last the switching operation 18*e* and after passage of a fixed predefined second delay 24, which is longer than the first delay 20, in this case 30 seconds, to perform multiple further switching operations 18*f*, 18*g*, the second delay 24 being provided between each two successive further switching operations 18*f*, 18*g*. The further switching operations 18*f*, 18*g* are performed until the control equipment 13 receives a deactivation signal at its input 14. Providing the further switching operations 18*f*, 18*g* is based on the consideration that after the first five switching operations 18*a* through 18*e*, the probability of a disconnection of the high-voltage battery 3 from the intermediate circuit capacitor 7 is relatively small, so that then the further switching operations 18*f*, 18*g* are only still carried out if it has been ensured, by observing the second delay 24 that the temperature 23 is not reached even given an indefinite number of further switching operations 18*f*, 18*g*. Nevertheless, attempts are still made by the switching operations 18*f*, 18*g* to discharge of the intermediate circuit capacitor 7, if the interrupter 4 should still realize a disconnection.

Consequently, the further switching operations 18*f*, 18*g* are performed until the deactivation signal is received at the input 14, however, at the longest until there is no more low voltage supply 25 to the control equipment 13.

Consequently, the device 1 can be produced by a process involving providing, in a first step, the high-voltage battery 3 to feed the power converter 2 and the intermediate circuit capacitor 7 for the power converter 2. In a following production step, the control equipment 13 is provided, which is set up to perform the previously described switching operations 18*a* through 18*g*. Then, the discharge device 8 to be controlled by the control equipment 13 is provided, the load resistor 10 being selected and integrated into the power converter 2 in such a way that the load resistor 10 is not damaged if a maximum constant voltage of the high-voltage battery 3 is applied to it for the fixed predefined duration 19 followed by it cooling for a respective delay 20, 24. Then, the high-voltage battery 3 is connected with the discharge device 8 and the intermediate circuit capacitor 7 through the interrupter 4, and the control equipment 13 is connected with the discharge device 8.

The invention claimed is:

1. A device (1) for discharging an intermediate circuit capacitor (7), this device (1) comprising a power converter (2) for supplying electricity to an electrical machine (6) powering a vehicle, this power converter (2) having the intermediate circuit capacitor (7) and, connected in parallel with the intermediate circuit capacitor (7), a discharge device (8) with a series circuit of a controllable switching element (9) and a load resistor (10), and a high-voltage battery (3) feeding the power converter (2) on the input side, wherein the power converter (2) has control equipment (13) that is set up to control the switching element (9), depending on a signal state at an input (14) of the control equipment (13), to perform a fixed predefined number of switching operations (18a-18e), in which the switching element (9) conducts, with a fixed predefined duration (19) and a fixed predefined delay (20) between two successive switching operations (18a-18e), the load resistor (10) and its heat transfer to the power converter (2) being set up so that the load resistor (10) is not damaged if a maximum constant voltage of the high-voltage battery (3) is applied to it during a respective switching operation (18a-18e) and it cools for the or a respective delay (20).

2. A device according to claim 1, wherein the fixed predefined number of switching operations (18a-18e) is at least two, preferably at least five.

3. A device according to claim 1, wherein the fixed predefined duration (19) of a switching operation (18a-18e) is at least one second and/or no more than three seconds, and/or the delay is at least four seconds and/or no more than seven seconds.

4. A device according to claim 1, wherein the control equipment (13) is also set up to control the switching element (9) after the last of the switching operations (18a-18e) and after passage of a fixed predefined second delay (24), which is longer than the first delay (20), to perform multiple further switching operations (18f, 18g), the second delay (24) being provided between each two successive further switching operations (18f, 18g).

5. A device according to claim 4, wherein the second delay (24) is at least ten seconds, especially at least twenty-five seconds, and/or no more than fifty seconds, especially no more than thirty-five seconds.

6. A device according to claim 4, wherein the control equipment (13) is also set up to control the discharge device (8) to perform the further switching operations (18f, 18g) until a deactivation signal is received at the input (14).

7. A device according to claim 1, wherein the intermediate circuit capacitor (7) and the high-voltage battery (3) are connected with one another through an electrical connection having an interrupter (4), and a controller (5) is provided that is operable independently of the first control equipment (13) and is set up to provide a change in the signal state as an input signal (17) requesting the discharge of the intermediate circuit capacitor (7) to both the control equipment (13) and also to the interrupter (4).

8. A process for discharging an intermediate circuit capacitor (7) in a power converter (2) of a vehicle, this power converter (2) being used for supplying electricity to an electrical machine (6) powering the vehicle, this power converter (2) having the intermediate circuit capacitor (7) and, connected in parallel with the intermediate circuit capacitor (7), a discharge device (8) with a series circuit of a controllable switching element (9) and a load resistor (10), the switching element (9) being controlled, depending on a signal state, to perform a fixed predefined number of switching operations (18a-18e), in which the switching element (9) conducts, with a fixed predefined duration (19) and a fixed predefined delay (20) between two successive switching operations (18a-18e), the load resistor (10) and its heat transfer to the power converter (2) being set up so that the load resistor (10) is not damaged if a maximum constant voltage of a high-voltage battery (3) feeding the power converter (2) is applied to it during a respective switching operation (18a-18e) and it cools for the or a respective delay (20).

9. A process for producing a device (1) for discharging an intermediate circuit capacitor (7), this process comprising the following steps:
providing a high-voltage battery (3) for feeding a power converter (2) and providing an intermediate circuit capacitor (7) for the power converter (2);
providing control equipment (13) for the power converter (2), this control equipment (13) being set up to control a switching element (9) of a discharge device (8), depending on a signal state at an input (14) of the control equipment (13), to perform a fixed predefined number of switching operations (18a-18e), in which the switching element (9) conducts, with a fixed predefined duration (19) and a fixed predefined delay (20) between two successive switching operations;
providing the discharge device (8) to be controlled by the control equipment (13) with a series circuit of a controllable switching element (9) and a load resistor (10), the load resistor (10) being selected and integrated into the power converter (2) in such a way that the load resistor (10) is not damaged if a maximum constant voltage of the high-voltage battery (3) is applied to it for the respective fixed predefined duration (19) to discharge the intermediate circuit capacitor (7), followed by cooling for the or a respective delay (20); and
connecting the control equipment (13) with the discharge device (8).

* * * * *